US012418104B2

(12) United States Patent
He et al.

(10) Patent No.: US 12,418,104 B2
(45) Date of Patent: Sep. 16, 2025

(54) BASE STATION ANTENNA

(71) Applicant: Outdoor Wireless Networks LLC, Claremont, NC (US)

(72) Inventors: Fan He, Jiangsu (CN); Fusheng Lv, Jiangsu (CN); Zhanming Zhang, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 237 days.

(21) Appl. No.: 18/171,515

(22) Filed: Feb. 20, 2023

(65) Prior Publication Data

US 2023/0282971 A1 Sep. 7, 2023

(30) Foreign Application Priority Data

Mar. 3, 2022 (CN) ........................ 202210202034.3

(51) Int. Cl.
*H01Q 1/42* (2006.01)
*H01Q 1/24* (2006.01)
*H01Q 21/06* (2006.01)

(52) U.S. Cl.
CPC ............... *H01Q 1/42* (2013.01); *H01Q 1/246* (2013.01); *H01Q 21/061* (2013.01)

(58) Field of Classification Search
CPC ........... H01Q 1/12; H01Q 1/246; H01Q 1/42; H01Q 1/44; H01Q 1/50; H01Q 19/10; H01Q 19/104; H01Q 21/0006; H01Q 21/061; H01Q 1/405; H01Q 1/40
See application file for complete search history.

(56) References Cited

U.S. PATENT DOCUMENTS

| | | | | |
|---|---|---|---|---|
| 6,069,590 A * | 5/2000 | Thompson, Jr. | H01Q 21/26 343/797 |
| 2018/0040948 A1* | 2/2018 | Göttl | H01Q 19/108 |
| 2018/0337443 A1* | 11/2018 | Bisiules | H01Q 1/246 |
| 2021/0075092 A1 | 3/2021 | Su et al. | |
| 2023/0104131 A1* | 4/2023 | Varnoosfaderani | H01Q 21/26 343/702 |
| 2023/0208014 A1* | 6/2023 | Zhang | H01Q 19/06 343/745 |

FOREIGN PATENT DOCUMENTS

| | | |
|---|---|---|
| CN | 205992589 U | 3/2017 |
| CN | 206546874 U | 10/2017 |

OTHER PUBLICATIONS

"Extended European Search Report corresponding to European Application No. 23160023.0 dated Jul. 20, 2023".

* cited by examiner

*Primary Examiner* — Hoang V Nguyen
(74) *Attorney, Agent, or Firm* — Myers Bigel, P.A.

(57) ABSTRACT

The present disclosure relates to a base station antenna; the base station antenna comprises: a radio; a feed board and a radiating element array mounted on the feed board, where the radiating element array comprises a plurality of radiating elements, and each radiating element extends forward from the feed board; a radome arranged in front of the radiating element array; and a plurality of radome supporting members mounted on the radio and extending forward from the radio to the radome for supporting the radome.

16 Claims, 8 Drawing Sheets

BASE STATION ANTENNA

RELATED APPLICATION

The present application claims priority from and the benefit of Chinese Patent Application No. 202210202034.3, filed Mar. 3, 2022, the disclosure of which is hereby incorporated herein by reference in full.

FIELD OF THE INVENTION

The present disclosure generally relates to the field of radio antenna, and more specifically, the present disclosure relates to a base station antenna.

BACKGROUND OF THE INVENTION

Base station antennas usually operate in open areas, and are directly subject to the natural forces of rainstorm, snow, dust, and solar radiation, etc., which reduces antenna accuracy of base station antenna systems, shortens their lifespans and causes their work reliability to be poor. Therefore, there is a need to mount a radome in the base station antenna to protect the base station antenna system from external environmental impact. Therefore, how to ensure the stability of the radome in a reliable manner and to prevent the antenna system from being damaged by the toppling of the radome is a technical problem that urgently needs to be solved by those of ordinary skill in the art.

SUMMARY OF THE INVENTION

Therefore, the objective of the present disclosure is to provide a base station antenna capable of overcoming at least one drawback in the prior art.

According to a first aspect of the present disclosure, a base station antenna is provided; the base station antenna comprises: a radio; a feed board and a radiating element array mounted on the feed board, where the radiating element array comprises a plurality of radiating elements, and each radiating element extends forward from the feed board; a radome arranged in front of the radiating element array; and a plurality of radome supporting members mounted on the radio and extending forward from the radio to the radome for supporting the radome.

According to a second aspect of the present disclosure, a base station antenna is provided; the base station antenna comprises: a feed board; a radiating element array mounted on the feed board, where the radiating element array comprises a plurality of radiating elements and each radiating element extends forward from the feed board; a radome arranged in front of the radiating element array; radome supporting members for supporting the radome mounted on the radome and extending rearward from the radome.

BRIEF DESCRIPTION OF THE DRAWINGS

The present disclosure will be explained in more detail by means of embodiments with reference to the accompanying drawings. The schematic drawings are briefly described as follows.

DETAILED DESCRIPTION OF THE INVENTION

Figure 1:
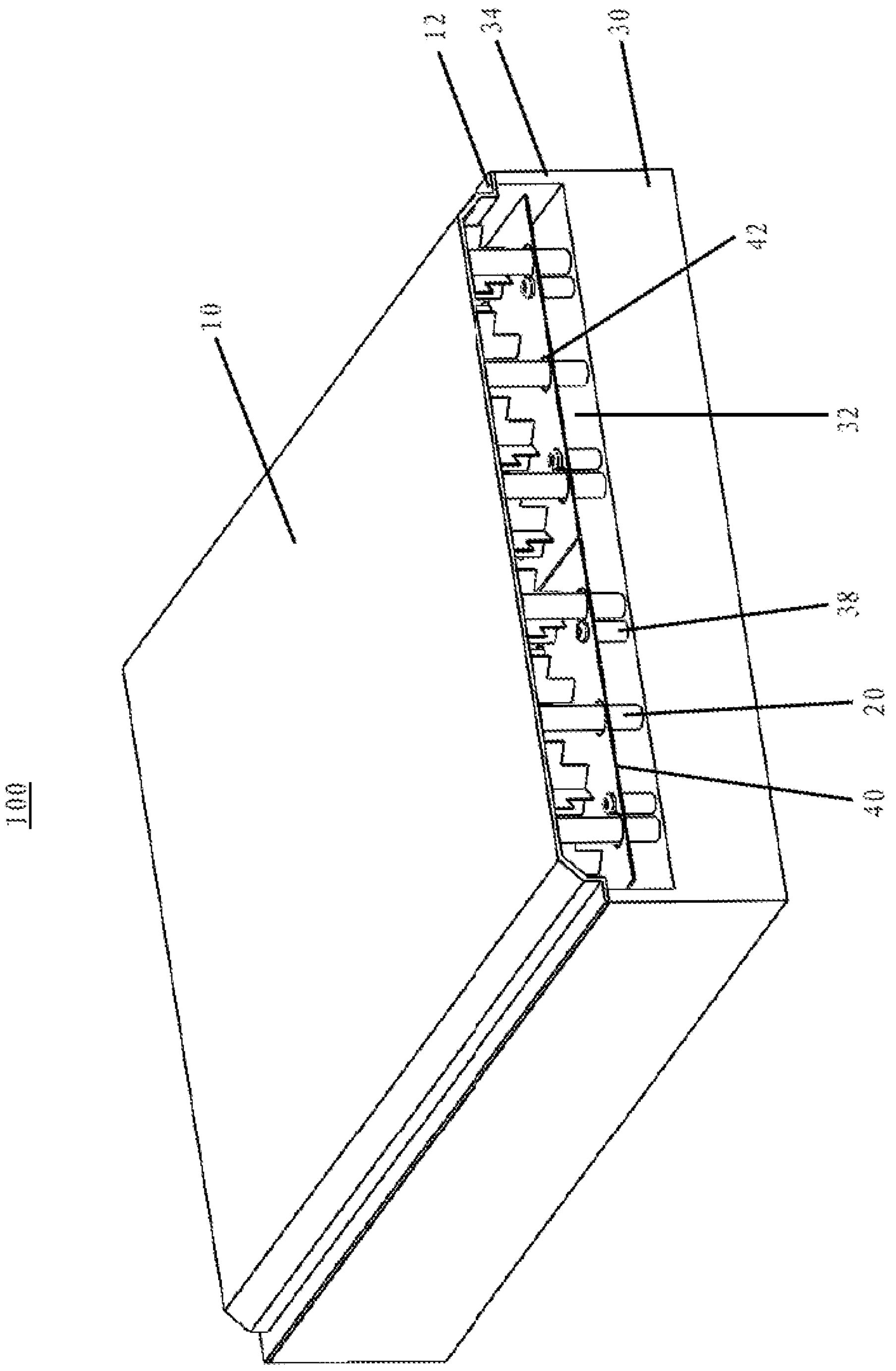
FIG. 1 shows a schematic perspective view of a base station antenna according to a first embodiment of the present disclosure.

The present disclosure will be described below with reference to the attached drawings, which show several examples of the present disclosure. However, it should be understood that the present disclosure can be presented in many different ways and is not limited to the examples described below. In fact, the examples described below are intended to make the present disclosure more complete and to fully explain the protection scope of the present disclosure to those skilled in the art. It should also be understood that the examples disclosed in the present disclosure may be combined in various ways so as to provide more additional examples.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "schematic" or "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or specific embodiments.

As used herein, the word "basically" means including any minor changes caused by design or manufacturing defects, device or component tolerances, environmental influences, and/or other factors.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

The base station antenna may be mounted on an elevated structure, for example, a base station antenna tower, a telegraph pole, a building, or a water tower, such that the longitudinal axis thereof extends substantially perpendicular to the ground. The base station antenna is usually mounted in a radome that provides environmental protection. In the base station antenna, the radome is a structure that protects the base station antenna system from external environmental impact. In terms of electrical performance, the radome has good electromagnetic wave penetration characteristics, and in terms of mechanical performance, the radome is capable of withstanding the effects of harsh external environments (such as rainstorm, snow, sand and solar radiation). Generally, radome supporting members are additionally mounted in the base station antenna for supporting the radome, thereby further stabilizing the radome and preventing the base station antenna system from being damaged by the toppling of the radome. These radome supporting members are generally mounted on for example, an aluminum reflector of the base station antenna. However, the reliable mounting of each radome supporting member on the reflector is rather labor-intensive.

However, the inventor(s) also found that: in some application scenarios, for example, some low cost and/or low-weight base station antennas are not mounted with a special reflector to reduce the cost and/or weight of the base station antenna. To this end, how to reliably mount radome supporting members for such base station antennas is also a technical problem that urgently needs to be solved.

The base station antenna according to some embodiments of the present disclosure may relate to such reflector-free base station antennas.

The base station antenna according to some embodiments of the present disclosure may be constructed as an active antenna device. The active antenna device may include one or more arrays of radiating elements that operate under fifth generation (5G or higher version) cellular network standards. In 5G mobile communication, the frequency range of communication includes a main frequency band (specific portion of the range 450 MHZ-6 GHz) and an extended frequency band (24 GHz-73 GHZ, i.e., millimeter wave frequency band, mainly 28 GHZ, 39 GHz, 60 GHz and 73 GHz). The frequency range used in 5G mobile communication includes frequency bands that use higher frequencies in the previous generations of mobile communication. These arrays typically have individual amplitude and phase control over subsets of the radiating elements therein and perform active beamforming.

Figure 2:
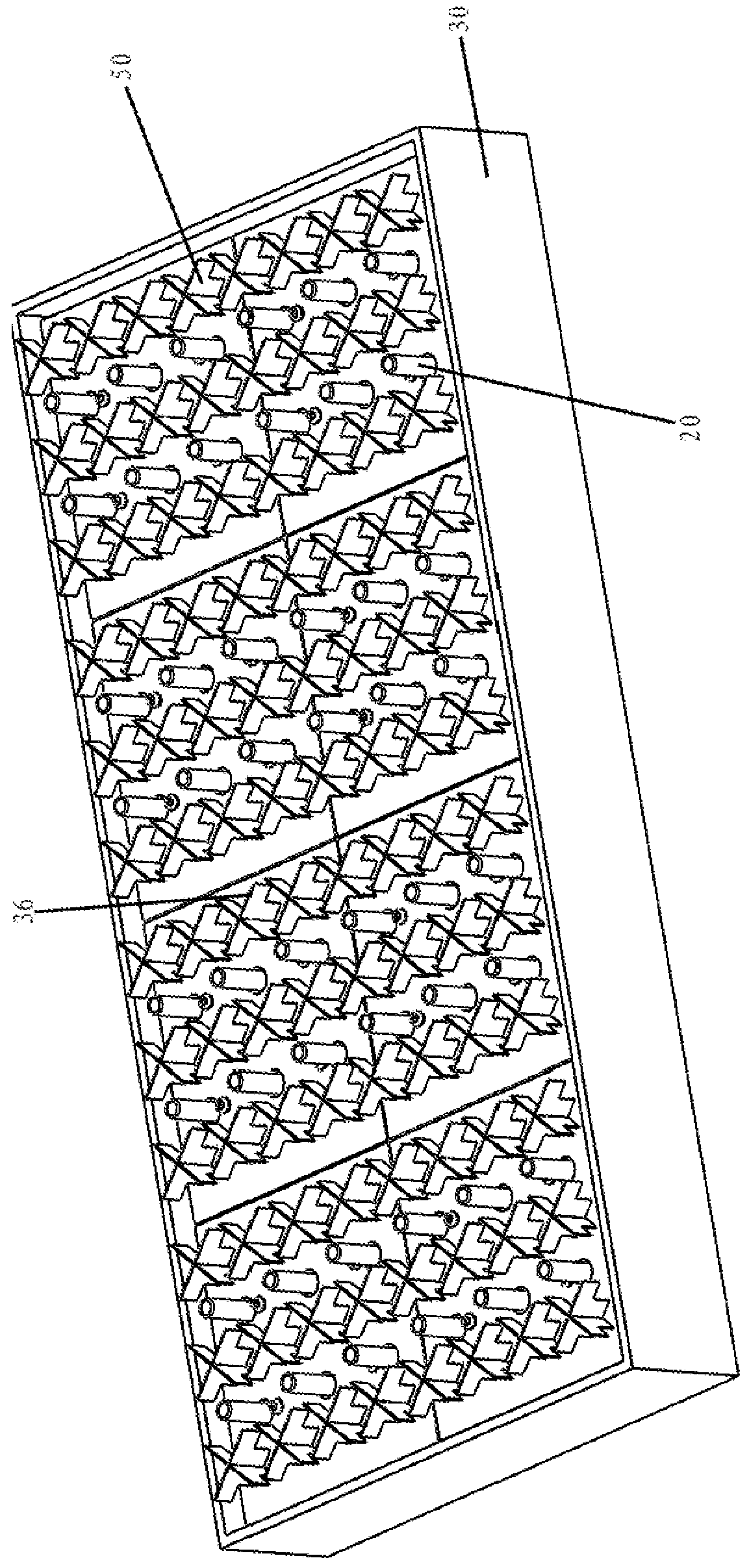
FIG. 2 shows a schematic diagram of the base station antenna in FIG. 1 without a radome.
Figure 3:
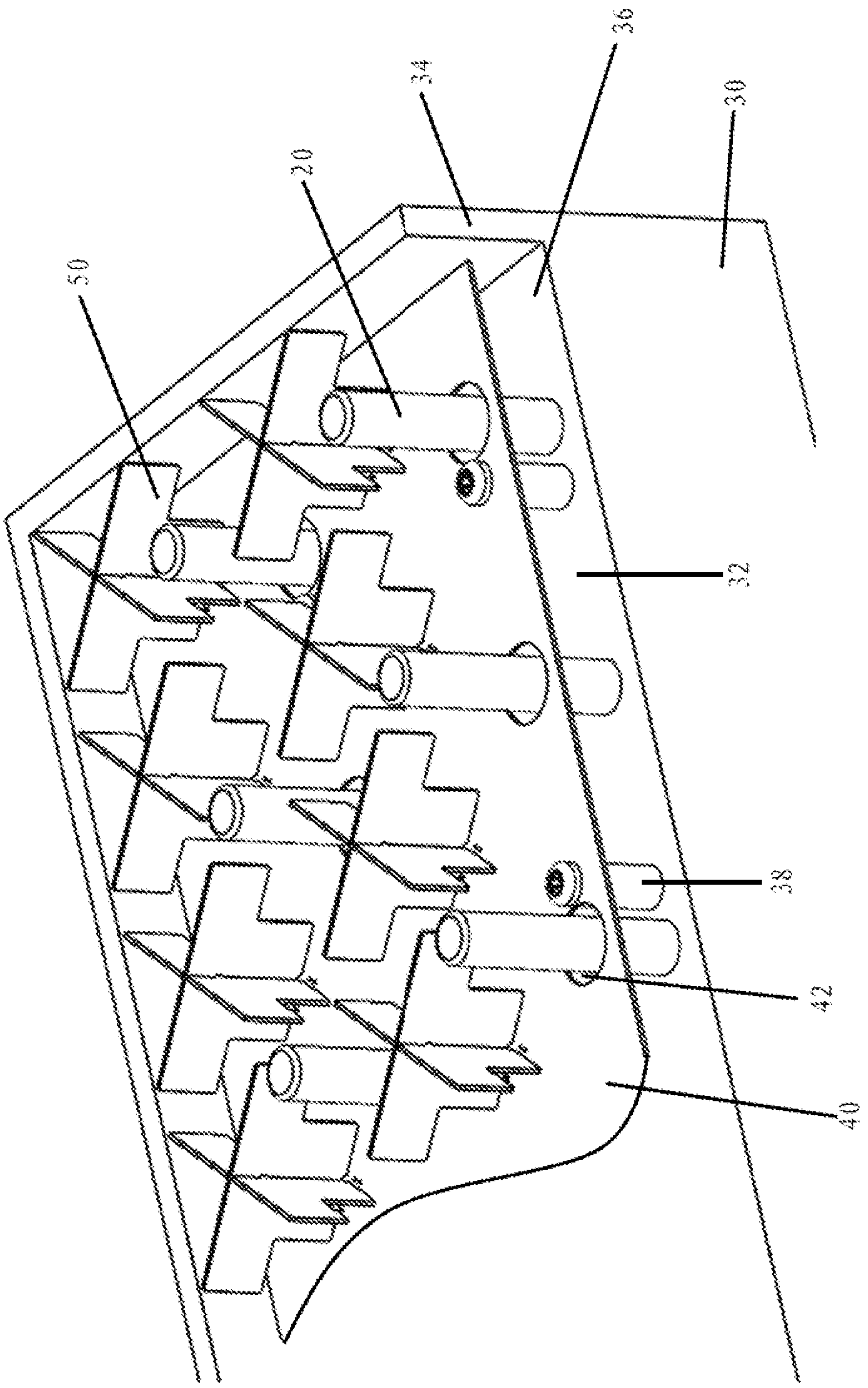
FIG. 3 shows a partial exemplary diagram of the base station antenna in FIG. 1, and also shows the mounting scheme of radome supporting members in the base station antenna.

Next, refer to FIGS. 1 to 3, which describe in detail a base station antenna 100 according to a first embodiment of the present disclosure. FIG. 1 shows a schematic perspective view of the base station antenna 100 according to the first embodiment of the present disclosure, and also shows the internal structure of the base station antenna 100; FIG. 2 shows a schematic diagram of the base station antenna 100 without a radome 10; FIG. 3 shows a partial exemplary diagram of the base station antenna 100' in FIG. 1 and also shows the mounting scheme of radome supporting members 20 in the base station antenna 100.

As shown in FIG. 1, the base station antenna 100 may comprise a radio 30 (the so-called Radio module), a feed board 40, a radiating element array 50 mounted on the feed board 40, and the radome 10 arranged in front of the radiating element array 50. The radiating element array 50 may comprise a plurality of radiating elements, and each radiating element extends forward from the feed board 40. The radio 30 may feed radio frequency signals to the feed board 40 through a radio frequency connector or other conductors, and in turn feed the signals to the radiating element array 50 mounted on the feed board 40.

In order to maintain the base station antenna 100 at a lower weight and/or lower cost, in the embodiment shown in the diagram, no special reflector is disposed between the radio 30 and the feed board 40, but the radio 30 functions as a reflector. Therefore, the radio 30 may have a metal front wall 32 that faces the rear surface of the feed board 40 and metal side walls 34 that extend forward from the metal front wall 32. A housing recess 36 is defined by the metal front wall 32 and side walls 34 of the radio 30. The feed board 40 and the radiating element array 50 mounted thereon may be received in the housing recess 36. The feed board 40 may be installed on the metal front wall 32 by means of screw thread fasteners 38, such as screws. Thus, the metal front wall 32 may be configured as the "reflector" for the radiating element array 50, so as to reflect electromagnetic waves from the radiating element array 50 forward.

In some embodiments, the metal side walls 34 of the radio 30 may extend forward from the metal front wall 32 to the front of the feed board 40. The side circumference 12 of the radome 10 may, for example, be fixed on the extending side walls 34 of the radio 30 by means of screw thread fasteners 38. These extending metal side walls 34 may also have functions similar to metal fences that are traditionally disposed on the reflector. In some embodiments, the size parameters of the metal side walls 34 may be adjusted so as to adjust the radiation pattern, for example, the front-to-back ratio from the radiating element array 50.

Such base station antennas 100 with the radio 30 integrated in the antenna may be the aforementioned active antenna device, which may comprise one or a plurality of radiating element arrays that operate under fifth generation (5G or later) cellular network standards. The reflector that is generally disposed is replaced by the integrated radio 30, for example, the metal front wall 32 thereof, thereby effectively reducing the weight and/or cost of the base station antenna 100.

In order to mount radome supporting members 20 reliably and efficiently for such reflector-free base station antennas 100, the radome supporting members 20 may be directly fixed on the radio 30 and extend forward from the radio 30 to the radome 10 for supporting the radome 10.

As shown in FIG. 2, a plurality of rows of radome supporting members 20 arranged in a distributed manner may be mounted in the base station antenna 100, so as to support the radome 10 fully and reliably. The corresponding radome supporting members 20, for example, may be mounted between the radiating element array 50 to prevent the corresponding radiating elements from being damaged by the toppling of the radome 10.

Referring to FIGS. 1 and 3, the radome supporting members 20 may extend forward from the metal front wall 32 of the radio 30 to the radome 10 until they are adjacent to or abutting the radome 10. In some embodiments, in order to mount radome supporting members 20 reliably and efficiently, each radome supporting member 20 may be integrated on the metal front wall 32 of the radio 30—for example, through a manufacturing process such as die casting, thereby circumventing the complex mounting process of the radome supporting members 20 and saving costs.

A series of through holes 42 for the radome supporting members 20 may be provided on the feed board 40. Each radome supporting member 20 may extend forward from the front wall 32 of the radio 30, pass through the corresponding through hole 42 and then further extend forward to the rear surface of the radome 10. In some embodiments, the through holes 42 on the feed board 40 may be formed to conform to the radome supporting members 20 so as to effectively prevent the shaking of the radome supporting members 20 and further improve the mounting reliability of the radome supporting members 20.

In the current embodiment, the radome supporting members 20 may be constructed as support posts. It should be understood that the radome supporting members 20 may be designed in diverse forms, for example, in a cylindrical shape, a prismatic shape, a frustum shape etc., and no further restriction is made here.

Figure 4:
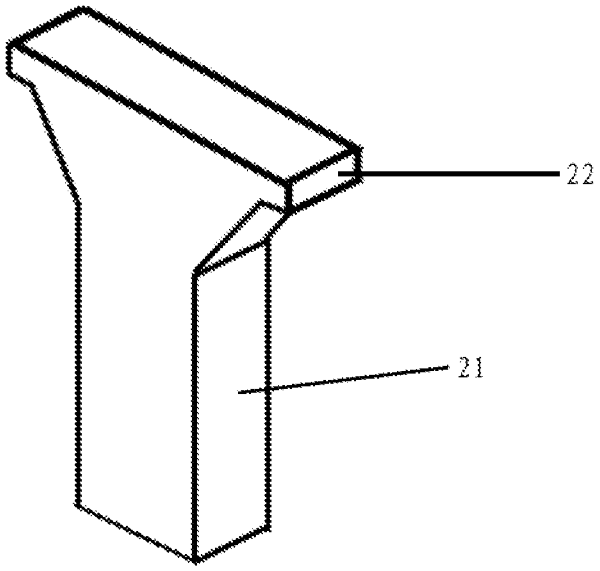
FIG. 4 shows a modified design scheme of the radome supporting member in FIG. 3.

FIG. 4 shows a modified design scheme of the radome supporting member 20. As shown in FIG. 4, the radome supporting member 20 may have a columnar extending section 21 extending forward from the radio 30 and a supporting end 22 for directly supporting the radome 10. Compared with the extending section 21, the supporting end 22 may have an enlarged cross-section. In some embodiments, the supporting end 22 of the radome supporting member 20 may further extend forward with a gradually increasing cross-section from the extending section 21 to the supporting radome 10. Thus, the supporting strength and reliability may be increased by increasing the contact area of the radome supporting member 20.

Figure 5:
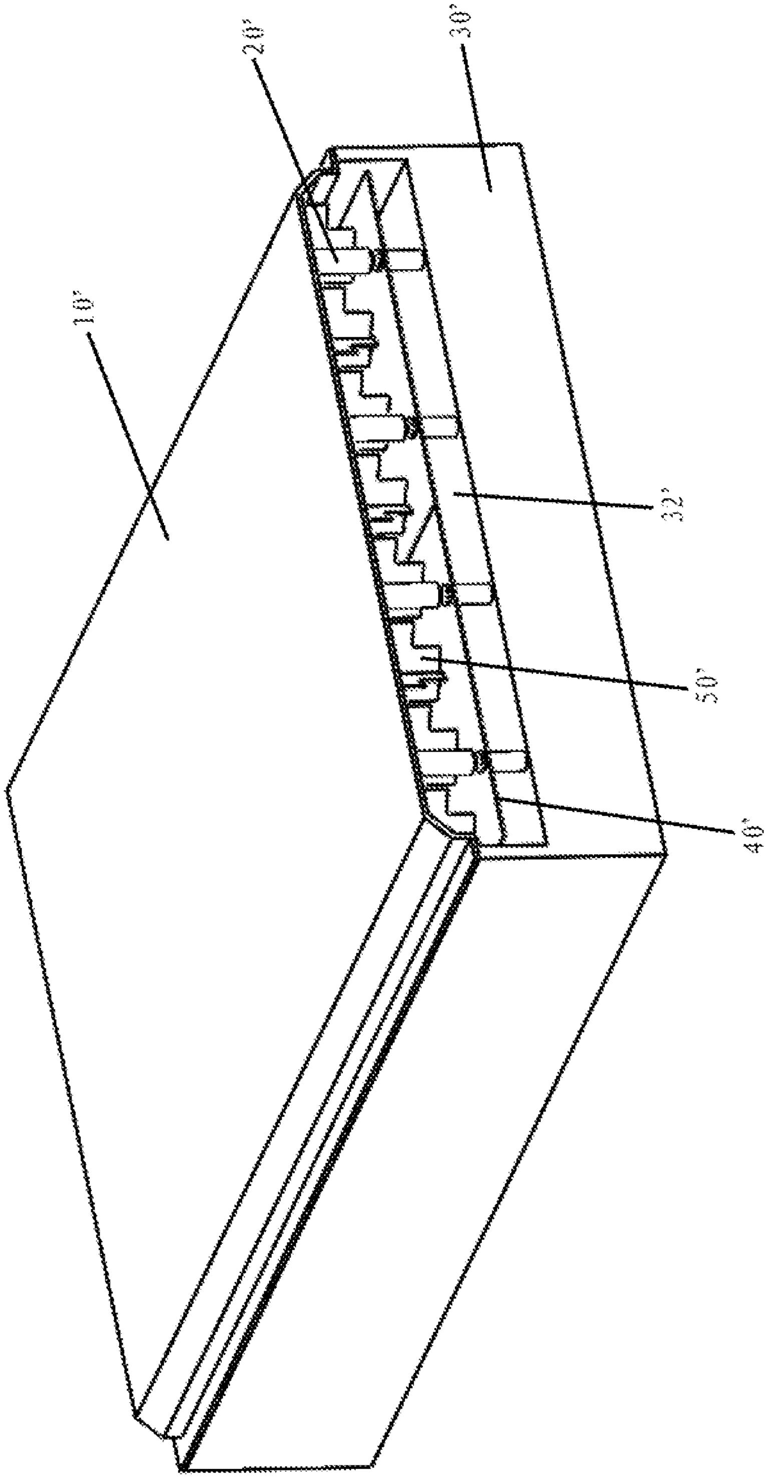
FIG. 5 is a schematic perspective view of a base station antenna according to a second embodiment of the present disclosure.
Figure 6:
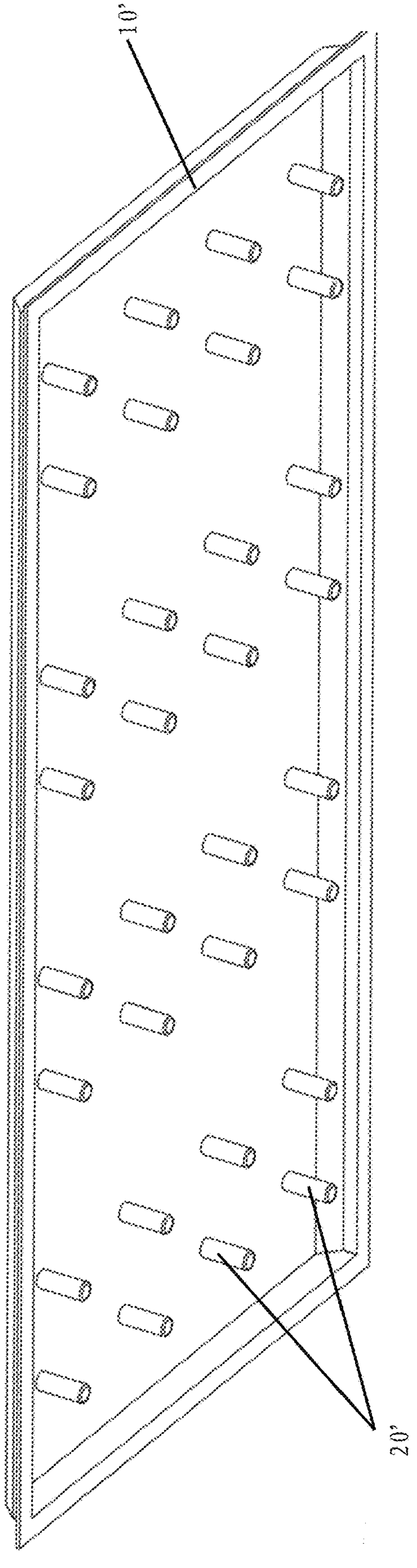
FIG. 6 shows a schematic perspective view of a radome of the base station antenna in FIG. 5.
Figure 7:
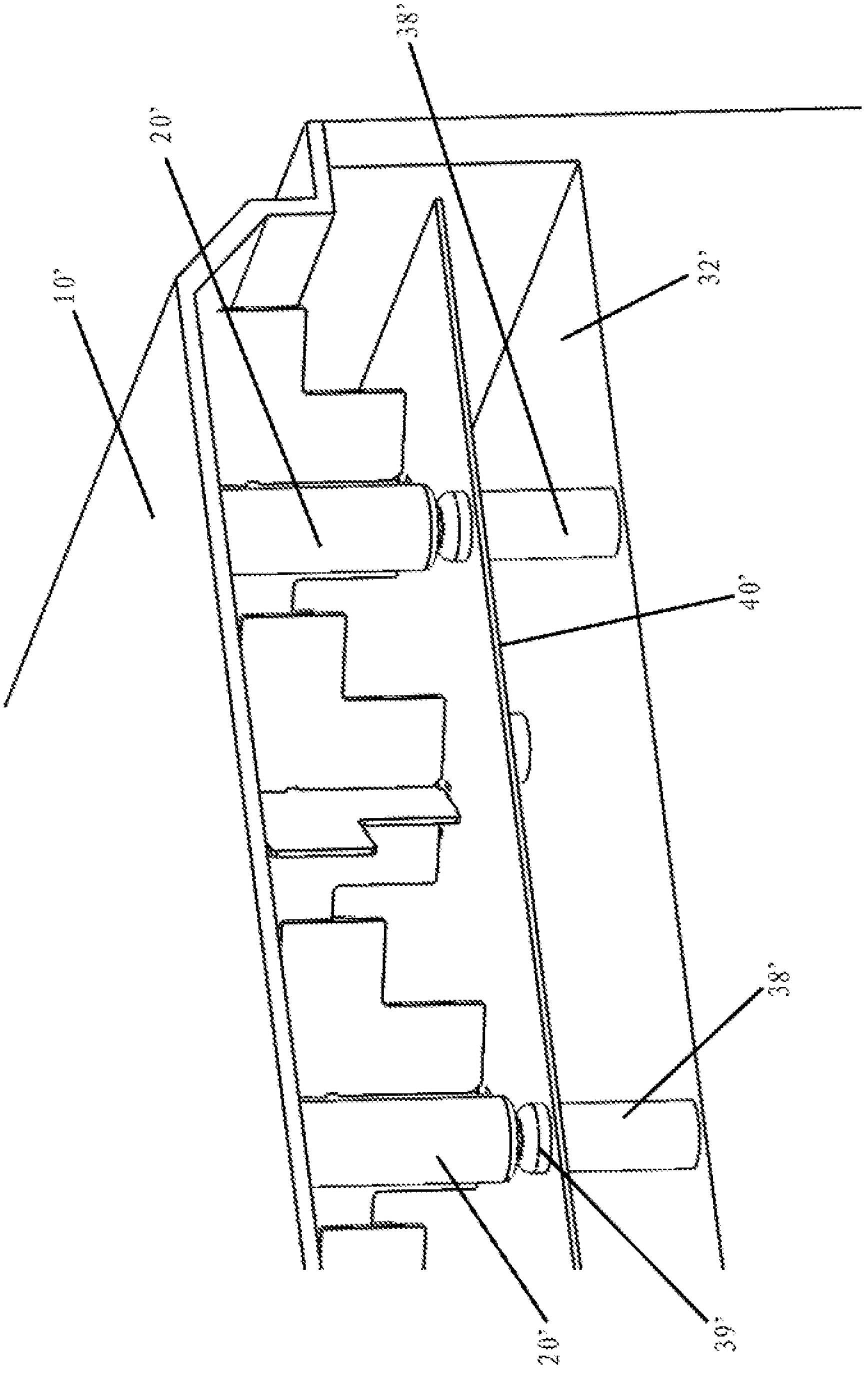
FIG. 7 shows a partial exemplary diagram of the base station antenna in FIG. 5, and shows the mounting scheme of radome supporting members in the base station antenna.

FIGS. 5 to 7 describe in detail a base station antenna 100' according to a second embodiment of the present disclosure. FIG. 5 shows a schematic perspective view of the base station antenna 100' according to the second embodiment of the present disclosure, and also shows the internal structure of the base station antenna 100'; FIG. 6 shows a schematic perspective view of a radome 10' of the base station antenna 100'; FIG. 7 shows a partial exemplary diagram of the base station antenna 100', and shows the mounting scheme of radome supporting members 20' in the base station antenna 100'. It should be understood that the discussion above of the base station antenna 100 according to the first embodiment of the present disclosure may be equally applicable to the base station antenna 100 of the second embodiment of the present disclosure as long as they do not contradict each other, and it need not be described again here.

The base station antenna 100' according to the second embodiment of the present disclosure differs from the base station antenna 100 in the first embodiment in that, instead of fixing or integrating the radome supporting members 20 on the radio 30, the radome supporting members 20' are fixed or integrated on the radome 10' and extend rearward from the radome 10' to the supporting parts of the radome supporting members 20'.

As shown in FIG. 5, the radome supporting members 20' may be integrated on the rear surface of the radome 10'—for example, through a manufacturing process such as injection molding, thereby circumventing the complex mounting process of the radome supporting members 20' and saving costs. Therefore, the radome supporting members 20' may be constructed as plastic members. As shown in FIG. 5, a plurality of rows of radome supporting members 20' arranged in a distributed manner are molded on the rear surface of the radome 10' and each radome supporting member 20' may extend rearward from the radome 10' to the supporting parts for the radome supporting members 20'. It should be understood that the radome supporting members 20' may also be fixed on the rear surface of the radome 10' through feasible mounting methods, for example, screw thread connection, plugging or bonding.

In some embodiments, the base station antenna 100' according to the second embodiment of the present disclosure may be a traditional passive base station antenna, for example, a 4G antenna. The radio 30' is not integrated in the passive base station antenna, but a special reflector is mounted on the passive base station antenna.

In the embodiment shown in the diagram, the base station antenna 100' according to the second embodiment of the present disclosure may be realized as the aforementioned active antenna device, with the radio 30' being integrated therein. A specially disposed reflector is substituted by the integrated radio 30', for example, the metal front wall 32' thereof, thereby effectively maintaining the base station antenna 100' at a lower weight and/or lower cost.

The supporting parts for the radome supporting members 20' according to the present disclosure may be disposed on any suitable position inside the base station antenna 100'. In some embodiments, the supporting parts for the radome supporting members 20' may be disposed on the feed board 40'. In some embodiments, the supporting parts for the radome supporting members 20' may be disposed on the radio 30'. In some embodiments, for example, in the case of a traditional base station antenna 100' with a reflector, the supporting parts for the radome supporting members 20' may be disposed on the reflector.

In the embodiment shown in the diagram, the support part for the radome supporting members 20' may be disposed on the feed board 40'. That is to say, the radome supporting members 20' may extend rearward from the radome 10' to the supporting parts supported on the feed board 40'. As shown in FIG. 7, the supporting parts may be disposed on the screw thread fasteners 38', for example, the connecting end 39' of the screws, of the feed board 40'. The radome supporting members 20' may extend rearward from the radome 10' to the connecting end 39' abutting the screw thread fasteners 38' such that the radome supporting members 20' are stably supported on the feed board 40'. In this embodiment, the radome supporting members 20' do not need to pass through the feed board 40' again and thus may be realized with a shortened size, thereby saving materials and reducing the weight thereof. In some embodiments, the screw thread fastener 38' may be aligned with [another] screw thread fastener 38' in the forward direction, thereby saving space occupied in the base station antenna 100'.

Figure 8:
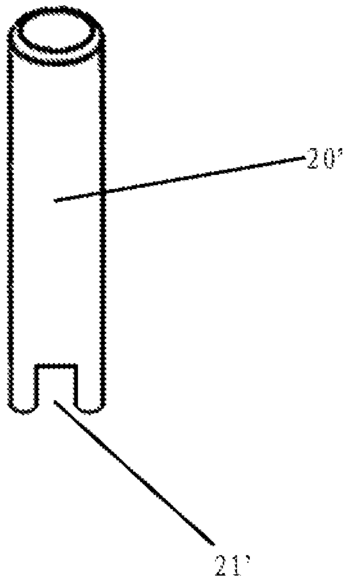
FIG. 8 shows a modified design scheme of the radome supporting member in FIG. 7.

FIG. 8 shows a modified design of the radome supporting member 20'. As shown in FIG. 8, the rear end of each radome supporting member 20' may have a corresponding groove 21' for accommodating the connecting end 39' of the screw thread fastener 38', such that the rear end of the radome supporting member 20' may be spliced to the connecting end 39' of the screw thread fastener 38' in the form of shape fitting. Thus, the mounting reliability of the radome supporting members 20' may be further improved by effectively preventing the shaking of the radome supporting members 20'.

Additionally, or alternately, the supporting parts for the radome supporting members 20' may be disposed on the radio 30', for example, on the metal front wall 32' thereof. To this end, a series of through holes (not shown) for the radome supporting members 20' may be provided on the feed board 40'. Each radome supporting member 20' may extend rearward from the radome 10', pass through the corresponding through hole and then further extend rearward to the radio 30', for example, the metal front wall 32' thereof.

In some embodiments, a groove (not shown) for accommodating the rear end of the radome supporting member 20' may be provided on the metal front wall 32' of the radio 30', thereby effectively prevent the shaking of the radome supporting member 20' and further improve the mounting reliability of the radome supporting member 20'.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

The invention claimed is:

1. A base station antenna, wherein the base station antenna comprises:
- a radio;
- a feed board and a radiating element array mounted on the feed board, where the radiating element array comprises a plurality of radiating elements and each radiating element extends forward from the feed board;
- a radome arranged in front of the radiating element array; and
- a plurality of radome supporting members mounted on the radio and extending forward from the radio to the radome for supporting the radome.

2. The base station antenna according to claim 1, wherein the radio comprises a metal front wall and the feed board is mounted on the metal front wall.

3. The base station antenna according to claim 2, wherein the feed board is mounted on the metal front wall with screw thread fasteners.

4. The base station antenna according to claim 2, wherein the metal front wall is configured as a reflector for the radiating element array to reflect electromagnetic waves from the radiating element array.

5. The base station antenna according to claim 2, wherein the radio has side walls extending forward from the metal front wall.

6. The base station antenna according to claim 1, wherein through holes for the radome supporting members are provided on the feed board, and the radome supporting members extend forward from the radio, pass through the through holes and then further extend forward to the rear surface of the radome.

7. The base station antenna according to claim 1, wherein the radome supporting members are configured as support posts.

8. The base station antenna according to claim 1, wherein the radome supporting members have an extending section extending forward from the radio and a supporting end for directly supporting the radome, where the supporting end further extends forward with an enlarged cross-section from the extending section to the radome.

9. The base station antenna according to claim 1, wherein the base station antenna comprises a plurality of rows of radome supporting members.

10. The base station antenna according to claim 1, wherein the base station antenna is constructed as an active antenna.

11. The base station antenna according to claim 1, wherein the radome supporting members are plastic members or metal members.

12. A base station antenna, wherein the base station antenna comprises:
- a feed board;
- a radiating element array mounted on the feed board, where the radiating element array comprises a plurality of radiating elements, and each radiating element extends forward from the feed board;
- a radome arranged in front of the radiating element array;
- radome supporting members for supporting the radome mounted on the radome and extending rearward from the radome;
- wherein the radome supporting members are integrated on the radome.

13. The base station antenna according to claim 12, wherein the radome supporting members are constructed as plastic members.

14. The base station antenna according to claim 12, wherein the radome supporting members are constructed as support posts.

15. The base station antenna according to claim 12, wherein the base station antenna comprises a plurality of rows of radome supporting members arranged in a distributed manner.

16. A base station antenna according to claim 12, wherein the base station is constructed as a 5G antenna.

* * * * *